United States Patent
Lee et al.

(10) Patent No.: US 9,167,066 B2
(45) Date of Patent: Oct. 20, 2015

(54) MOBILE COMMUNICATION TERMINAL HAVING A LIGHT GUIDE PLATE FOR INDICATING RECEIPT OF A SIGNAL

(75) Inventors: Chung Hoon Lee, Gwangmueong-si (KR); Sang Min Lee, Siheung-si (KR); Kwang Il Park, Seoul (KR)

(73) Assignee: Seoul Semiconductor Co., Ltd., Ansan-si (KR)

(*) Notice: Subject to any disclaimer, the term of this patent is extended or adjusted under 35 U.S.C. 154(b) by 1032 days.

(21) Appl. No.: 11/908,184

(22) PCT Filed: Mar. 8, 2006

(86) PCT No.: PCT/KR2006/000813
§ 371 (c)(1),
(2), (4) Date: Sep. 10, 2007

(87) PCT Pub. No.: WO2006/098563
PCT Pub. Date: Sep. 21, 2006

(65) Prior Publication Data
US 2008/0167085 A1    Jul. 10, 2008

(30) Foreign Application Priority Data

Mar. 18, 2005 (KR) .................. 10-2005-0022502

(51) Int. Cl.
*H04M 1/00* (2006.01)
*H04M 1/22* (2006.01)
*H04M 19/04* (2006.01)
*H04M 1/02* (2006.01)

(52) U.S. Cl.
CPC ............... *H04M 1/22* (2013.01); *H04M 19/04* (2013.01); *H04M 1/0216* (2013.01); *H04M 19/048* (2013.01); *H04M 2250/16* (2013.01)

(58) Field of Classification Search
CPC .................................................... H04M 19/048
USPC ............... 455/566, 575.1–575.9, 550, 567; 349/60; 362/800
See application file for complete search history.

(56) References Cited

U.S. PATENT DOCUMENTS

| 6,550,953 | B1 * | 4/2003 | Ichikawa et al. ................. 315/56 |
| 2002/0111195 | A1 * | 8/2002 | Kweon et al. ................. 455/566 |
| 2004/0012730 | A1 * | 1/2004 | Pan et al. ........................ 349/60 |

FOREIGN PATENT DOCUMENTS

| JP | 2001-292206 | 10/2001 |
| JP | 2002-125016 | 4/2002 |
| KR | 20-0194807 | 9/2000 |
| KR | 1020020078418 | 10/2002 |
| KR | 1020030011469 | 2/2003 |
| KR | 1020040059336 | 7/2004 |

* cited by examiner

*Primary Examiner* — Hsin-Chun Liao
(74) *Attorney, Agent, or Firm* — H.C. Park & Associates, PLC

(57) ABSTRACT

Disclosed is a mobile communication terminal having a light guide plate for indicating the receipt of a signal. This mobile communication terminal comprises an upper frame. A light guide plate is mounted in the upper frame. The light guide plate has an opening corresponding to a region of an image display window. In addition, at least one LED is arranged adjacent to the light guide plate so as to introduce light into the light guide plate. Since the light guide plate is used for indicating the receipt of a signal, it is possible to provide a mobile communication terminal allowing a user to easily recognize a state where a signal has been received.

17 Claims, 2 Drawing Sheets

MOBILE COMMUNICATION TERMINAL HAVING A LIGHT GUIDE PLATE FOR INDICATING RECEIPT OF A SIGNAL

BACKGROUND OF THE INVENTION

1. Field of the Invention

The present invention relates to a mobile communication terminal having the function of indicating the receipt of a signal, and more particularly, to a mobile communication terminal employing a light guide plate for indicating the receipt of a signal so that the receipt of the signal can be indicated over a wide region, thereby enabling a user to easily check the receipt of the signal.

2. Discussion of the Background

A mobile communication terminal, particularly a portable mobile communication terminal is widely used since it can be easily carried and have various functions in addition to wireless communication. Such a mobile communication terminal has various functions such as wireless communication and transmission and receipt of text or voice messages, and it is expected that the mobile communication terminal will continue to have more functions.

Meanwhile, in a case where a call or a message is transmitted from another user, the mobile communication terminal generates a receipt signal to inform a user that the call or message has been received. Generally, examples of such a receipt signal include a bell sound or vibration. However, the bell sound cannot be used in specific places, and the vibration has a problem in that a user may not recognize the receipt signal if the user does not carry the mobile communication terminal and thus cannot feel the vibration.

In order to supplement the function of a receipt signal, there has been proposed a mobile communication terminal with an incoming signal lamp. FIG. 1 is a perspective view showing a conventional mobile communication terminal with an incoming signal lamp.

Referring to FIG. 1, the mobile communication terminal 1 is a folder-type mobile communication terminal comprising an upper folder 4 and a lower folder 7. The upper folder 4 generally includes a lower case 3 and an upper case 5, and a liquid crystal display module for screen display is contained between the upper and lower cases. The upper case has a display window 13 so that a user can externally view an image created by the contained display module.

Meanwhile, the lower folder 7 has a keypad and a contained printed circuit board, and further has a battery pack mounted thereon. The lower folder 7 is coupled to the upper folder 4 by means of a hinge 9 to construct the mobile communication terminal 1.

Generally, an incoming signal lamp 11 is provided at the hinge 9. The incoming signal lamp 11 comprises a light emitting diode and a transparent window. In the incoming signal lamp 11, the light emitting diode is flickered when a call signal is received from the outside, thereby informing a user of the receipt of the call signal.

The conventional mobile communication terminal is provided with the incoming signal lamp 11, thereby advantageously supplementing limitations on the indication of the receipt of a signal by means of a bell sound or vibration, and allowing a user to easily recognize the receipt of a signal at night or in a dark place and to check the position of the mobile communication terminal.

Since the conventional incoming signal lamp 11 is small as shown in the figure, however, there is a limitation on user's recognition of the receipt of a signal.

SUMMARY OF THE INVENTION

An object of the present invention is to provide a mobile communication terminal having the function of indicating the receipt of a signal so that a user can easily recognize the receipt of the signal.

In order to accomplish the above object, the present invention provides a mobile communication terminal having a light guide plate for indicating the receipt of a signal.

This mobile communication terminal comprises an upper frame. A light guide plate is mounted in the upper frame. The light guide plate has an opening corresponding to a region of an image display window. Meanwhile, at least one light emitting diode (LED) is arranged adjacent to the light guide plate to introduce light into the light guide plate. Accordingly, since the receipt of a signal is displayed using the light guide plate with a wide area, a user can easily recognize the receipt of the signal.

Meanwhile, an upper cover may cover the light guide plate. At least a portion of the upper cover may be transparent and made of a transparent resin. Accordingly, the receipt of a signal is indicated through the transparent portion of the upper cover, and the transparent portion may be defined in various shapes as desired by the user.

An LED array module may be arranged adjacent to the light guide plate. The LED array module may include the LED and a printed circuit board. The LED array module may be positioned at a side of or below the light guide plate.

Preferably, the mobile communication terminal is a folder-type mobile communication terminal or a slide-type mobile communication terminal. The folder-type mobile communication terminal includes a lower folder and an upper folder, and the slide-type mobile communication terminal includes a main body and a sliding unit.

However, the terms "lower folder" and "upper folder" used herein are construed to include the meanings of the main body and the sliding unit, unless specifically defined in other ways.

According to an aspect of the present invention, a mobile communication terminal having a light guide plate for indicating the receipt of a signal comprises a lower folder and an upper folder, and the upper folder includes an upper case with an upper display window. Meanwhile, the upper case includes an upper frame, a light guide plate mounted in the upper frame and having an opening corresponding to a region of an image display window, and at least one LED arranged adjacent to the light guide plate to introduce light into the light guide plate.

Meanwhile, an upper cover may cover the light guide plate. At least a portion of the upper cover may be transparent and made of a transparent resin.

An LED array module may be arranged adjacent to the light guide plate. The LED array module includes the LED and a printed circuit board. The LED array module may be positioned at a side of or below the light guide plate.

Meanwhile, the upper folder may further include a lower case with a lower display window.

According to the embodiments of the present invention, there is provided a mobile communication terminal that allows a user to more easily recognize the receipt of a signal as compared with a conventional incoming signal lamp.

DETAILED DESCRIPTION OF THE ILLUSTRATED EMBODIMENTS

Hereinafter, preferred embodiments of the present invention will be described in detail with reference to the accompanying drawings.

Figure 2:
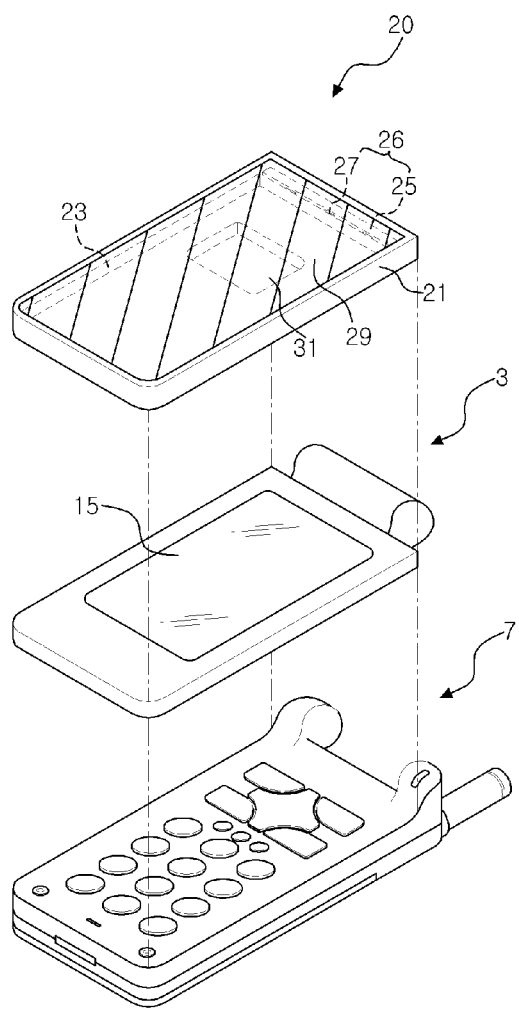
FIG. 2 is an exploded perspective view showing a mobile communication terminal having a light guide plate for indicating the receipt of a signal according to an embodiment of the present invention.

FIG. 2 is an exploded perspective view showing a mobile communication terminal having a light guide plate for indicating the receipt of a signal according to an embodiment of the present invention.

Figure 1:
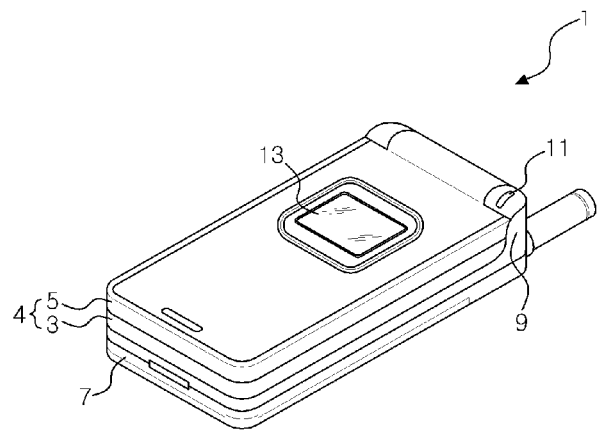
FIG. 1 is a perspective view showing a conventional mobile communication terminal.

Referring to FIG. 2, the mobile communication terminal has a lower folder 7 and an upper folder in the same manner as the mobile communication terminal shown in FIG. 1.

The lower folder 7 includes an upper surface with a keypad, and a lower surface on which a battery pack is mounted, and further has a hinge. A printed circuit board (PCB) is contained in the lower folder 7.

The upper folder includes a lower case 3 with a lower display window 15 and an upper case 20 with an upper display window 31. A display module (not shown) is positioned between the lower and upper cases 3 and 20 and displays an image through the lower display window 15 and/or the upper display window 31. The display module may be a liquid crystal display module or an organic EL module. Although a module for displaying an image through the lower display window 15 and a module for displaying an image through the upper display window 31 are usually separately contained therein, it is also possible to use one display module for displaying an image through the lower and upper display windows 15 and 31. The display module is electrically connected to the PCB through the hinge.

Meanwhile, the upper case 20 includes an upper frame 21, and a light guide plate 23 is mounted on the upper frame according to embodiments of the present invention. One or more light emitting diodes (LEDs) 27 for introducing light into the light guide plate 23 are arranged adjacent to the light guide plate 23. The LEDs 27 are mounted on the PCB 25 while being arranged adjacent to the light guide plate 23. The PCB 25 and the LEDs 27 mounted thereon construct an LED array module 26. The LED array module 26 may be constructed to simultaneously or individually operate the plurality of LEDs 27 mounted on the PCB 25.

Meanwhile, an upper cover 29 may be positioned on the light guide plate 23. The upper cover protects the light guide plate 23.

Figure 3:
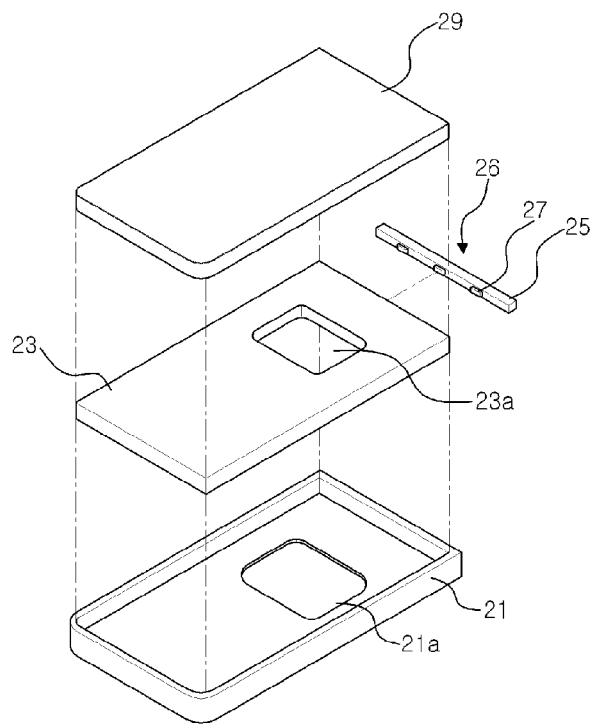
FIG. 3 is an exploded perspective view showing an upper case in which the light guide plate for indicating the receipt of a signal according to an embodiment of the present invention is disposed.

FIG. 3 is an exploded perspective view of the upper case 20 for describing the mobile communication terminal according to one embodiment of the present invention.

Referring to FIG. 3, the light guide plate 23 has an opening 23a corresponding to an upper window region. The light guide plate 23 can be formed of transparent resin or glass and has a reflective layer at its lower portion.

The LEDs 27 for introducing light into the light guide plate 23 are positioned adjacent to a side of the light guide plate 23.

The LEDs 27 may be LEDs that laterally or upwardly emit white light or other visible light.

The LEDs 27 may be mounted on the PCB 25. The PCB 25 has printed circuits for supplying a current to the LEDs 27, and the LEDs 27 can be simultaneously or individually driven through the circuits. The LEDs 27 and the PCB 25 construct the LED array module 26. The light introduced from the LEDs 27 is mixed within the light guide plate 23 and then emitted through an upper surface of the light guide plate 23.

The light guide plate 23 and the LEDs 27 are mounted in the upper frame 21. The upper frame has side surfaces defining the size of the upper case 20 and may have protrusions formed on its inner side surfaces or have a lower surface so that the light guide plate 23 and the LED array module 26 can be mounted. If the upper frame has a lower surface, it has at least a frame opening 21a corresponding to the opening of the light guide plate 23.

The LED array module 26 may be mounted in the upper frame 21 in the vicinity of one side of the light guide plate 23 and is then electrically connected to the PCB contained in the lower folder 7. Thus, upon receipt of a signal, the LED array module 26 emits light toward the light guide plate 23.

Meanwhile, the upper cover 29 covers the light guide plate 23. The upper cover 29 may be made of a transparent material so that the light emitted upwardly from the light guide plate 23 can pass therethrough, and may be formed by molding a transparent resin. On the other hand, a portion of the upper cover 29 may be made of a transparent material so that the light emitted from the light guide plate 23 can be transmitted therethrough, and the other portion thereof is made of an opaque material. At this time, a portion of the upper cover 29 corresponding to the opening 23a of the light guide plate 23, i.e., the window region, is made of a transparent material, and other portions of the upper cover except the window region are also made of a transparent material so that the light emitted from the light guide plate 23 can be transmitted therethrough. The other portions made of the transparent material may have various shapes, and accordingly, the receipt of a signal can be notified in a form desired by a user. The upper cover 29 may be mounted in the upper frame 21 as shown in the figure, or may be coupled to an upper portion of the upper frame 21.

Although this embodiment has been described as having one LED array module 26, a plurality of LED array modules 26 may be used. For example, at least two array modules may be arranged in the vicinity of both sides of the light guide plate 23 interposing the opening 23a of the light guide plate 23.

According to this embodiment, the receipt of a signal is notified through the light guide plate with a wide area, and thus, a user can easily recognize the receipt of a signal.

Figure 4:
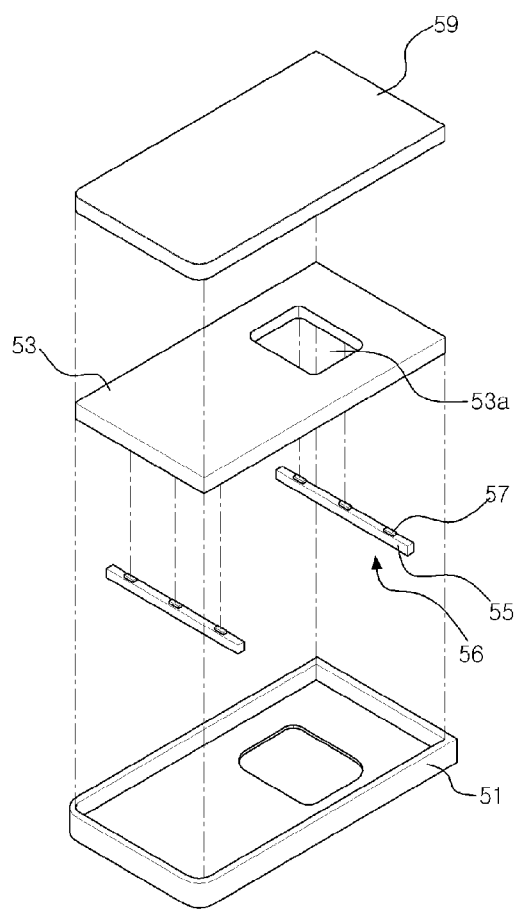
FIG. 4 is an exploded perspective view showing an upper case of a mobile communication terminal having a light guide plate for indicating the receipt of a signal according to another embodiment of the present invention.

FIG. 4 is an exploded perspective view showing an upper case according to another embodiment of the present invention.

Referring to FIG. 4, the upper case includes an upper frame 51, a light guide plate 53 and an upper case 59, as described with reference to FIG. 3. However, in this embodiment, LEDs 57 are arranged below the light guide plate 53.

The LEDs 57 may be mounted on a PCB 55 as described with reference to FIG. 3, and the LEDs and the PCB construct an LED array module 56. At this time, the LED array module 56 is arranged below the light guide plate 53. Meanwhile, the light guide plate 53 may have receiving grooves for receiving the LEDs 57 therein in a lower surface of the light guide plate. The LEDs 57 are received in the receiving grooves and emit light into the light guide plate 53. In this case, it is preferred that the LEDs 57 be side view LEDs, and accordingly, the LEDs 57 can emit light in all directions along the surface of the light guide plate 53 from the receiving grooves of the light guide plate 53.

Meanwhile, since the light guide plate 53 has the opening 53a, it is desirable to arrange LED array modules 56 at least on both sides of the opening 53a such that the opening is interposed therebetween.

According to this embodiment, since the LED array module 56 is arranged below the light guide plate 53, it is possible to increase the size of the light guide plate 53. By using side view LEDs capable of emitting light in all directions, usage efficiency of the light emitted from the LEDs 57 can be improved.

Meanwhile, although the embodiments have been described by way of example in connection with a folder-type mobile communication terminal, the present invention is not limited to such a folder-type mobile communication terminal but may also be applied to a slide-type mobile communication terminal. However, since the lower display window is generally positioned in the lower folder, i.e., a main body, in the slide-type mobile communication terminal, the lower display window of the upper folder may be eliminated.

The invention claimed is:

1. A mobile communication terminal having a light guide plate for indicating receipt of a signal, comprising:
    an upper frame;
    a light guide plate mounted in the upper frame and comprising an opening corresponding to a region of an image display window; and
    at least two light emitting diodes (LEDs) arranged on a printed circuit board (PCB) adjacent to a side of the light guide plate, the LEDs configured to introduce light laterally or upwardly into the light guide plate,
    wherein:
    the PCB comprises printed circuits configured to supply current to the LEDs;
    the LEDs are configured to be simultaneously or individually driven through the circuits; and
    the PCB is biased to the side of the light guide plate such that the PCB does not overlap the opening.

2. The mobile communication terminal as claimed in claim 1, further comprising an upper cover covering the light guide plate.

3. The mobile communication terminal as claimed in claim 2, wherein at least a portion of the upper cover is transparent.

4. The mobile communication terminal as claimed in claim 1, further comprising an LED array module including the LEDs and the printed circuit board.

5. The mobile communication terminal as claimed in claim 4, wherein the LED array module is positioned at a side of or below the light guide plate.

6. The mobile communication terminal as claimed in claim 1, wherein the mobile communication terminal is a folder-type mobile communication terminal.

7. The mobile communication terminal as claimed in claim 1, wherein the mobile communication terminal is a slide-type mobile communication terminal.

8. The mobile communication terminal as claimed in claim 1, wherein light introduced from the LEDs is configured to be mixed within the light guide plate and then emitted through an upper surface of the light guide plate.

9. The mobile communication terminal as claimed in claim 1, wherein three LEDs are arranged in a line on the PCB and face the same direction.

10. A mobile communication terminal having a light guide plate for indicating receipt of a signal, comprising:
    a lower folder; and
    an upper folder comprising an upper case,
    wherein the upper case comprises:
        an upper display window;
        an upper frame;
        a light guide plate mounted in the upper frame and comprising an opening corresponding to a region of the upper display window; and
        at least two light emitting diodes (LEDs) arranged on a printed circuit board (PCB) adjacent to a side of the light guide plate, the LEDs configured to introduce light laterally or upwardly into the light guide plate,
    wherein:
    PCB comprises printed circuits configured to supply current to the LEDs;
    the LEDs are configured to be simultaneously or individually driven through the circuits; and
    the PCB is biased to the side of the light guide plate such that the PCB does not overlap the opening.

11. The mobile communication terminal as claimed in claim 10, wherein the upper case further comprises an upper cover covering the light guide plate.

12. The mobile communication terminal as claimed in claim 11, wherein a portion of the upper cover is transparent.

13. The mobile communication terminal as claimed in claim 10, further comprising an LED array module including the LEDs and the printed circuit board.

14. The mobile communication terminal as claimed in claim 13, wherein the LED array module is positioned at a side of or below the light guide plate.

15. The mobile communication terminal as claimed in claim 10, wherein the upper folder further includes a lower case comprising a lower display window.

16. The mobile communication terminal as claimed in claim 10, wherein light introduced from the LEDs is configured to be mixed within the light guide plate and then emitted through an upper surface of the light guide plate.

17. The mobile communication terminal as claimed in claim 10, wherein three LEDs are arranged in a line on the PCB and face the same direction.

* * * * *